March 10, 1959  M. J. WEST ET AL  2,876,824
MACHINE FOR AND METHOD OF PROGRESSIVELY
CORRUGATING PLASTIC SHEET MATERIAL
Filed March 30, 1955                           3 Sheets-Sheet 1
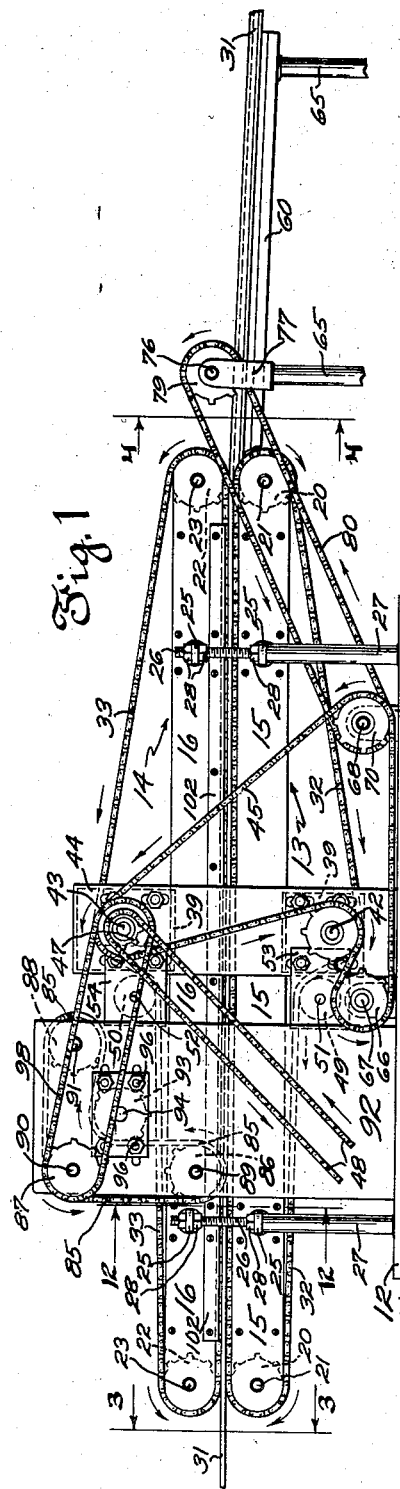
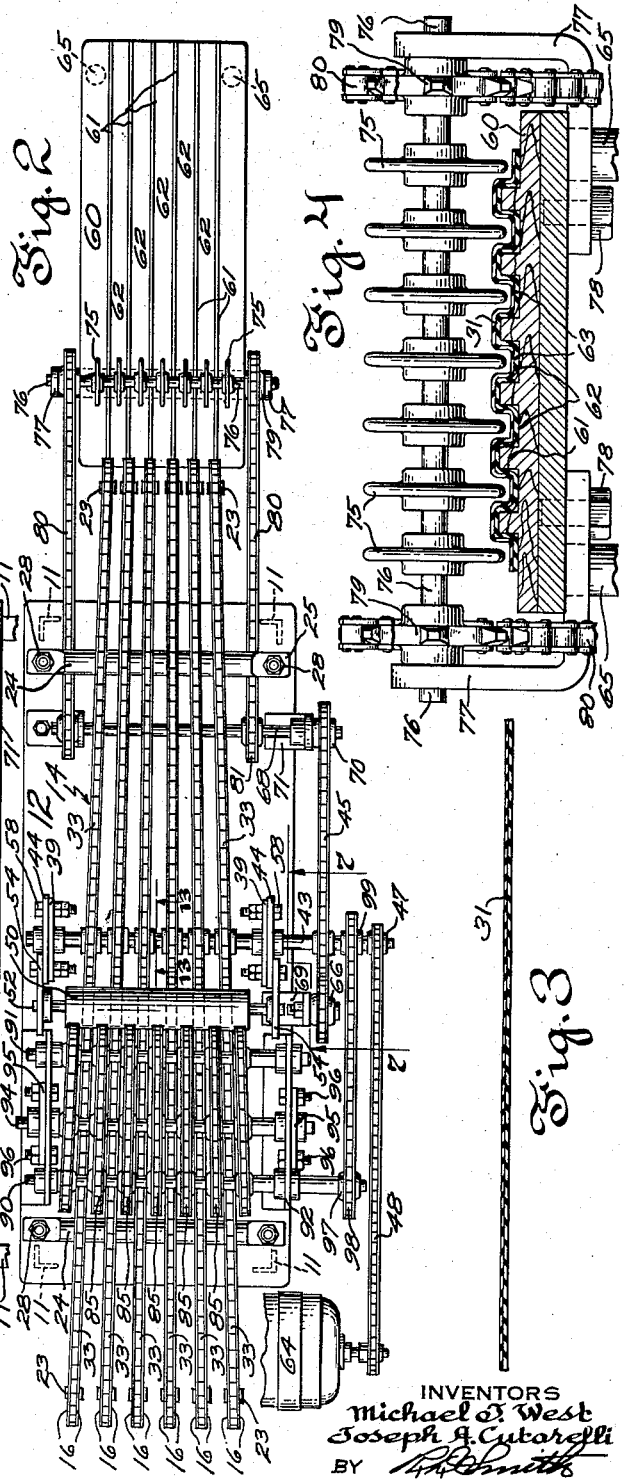
INVENTORS
Michael J. West
Joseph A. Cutorelli
BY
ATTORNEY

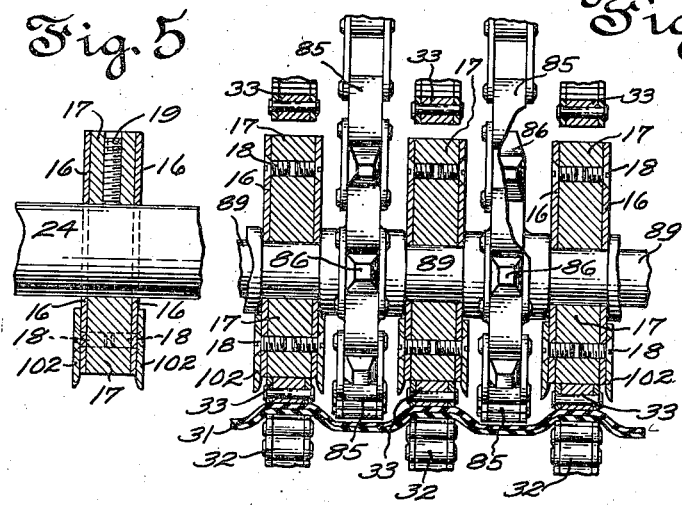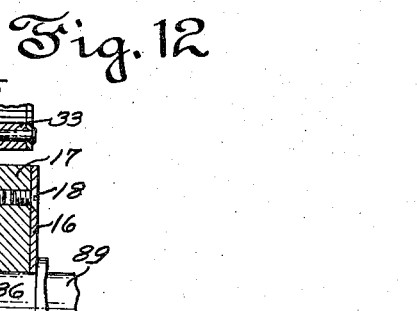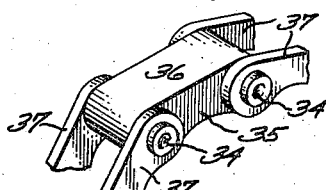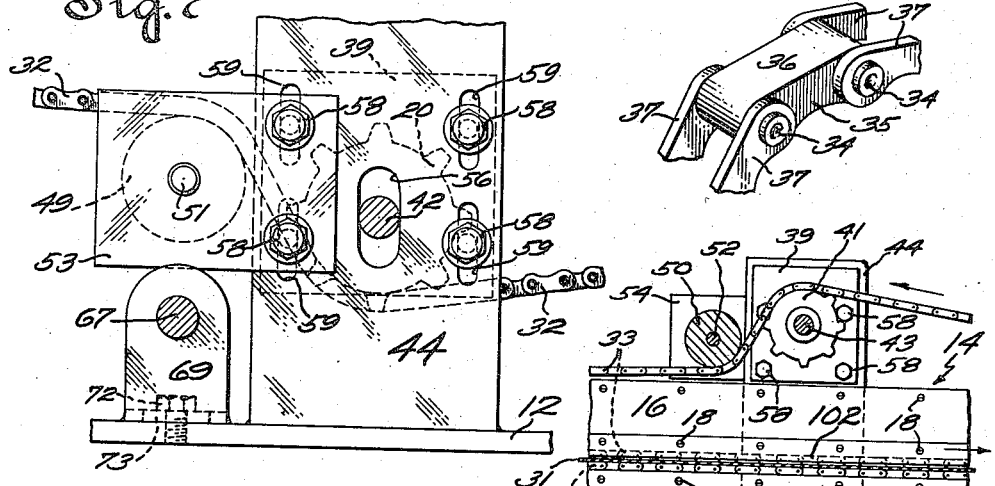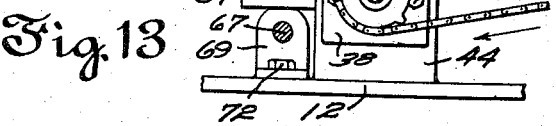

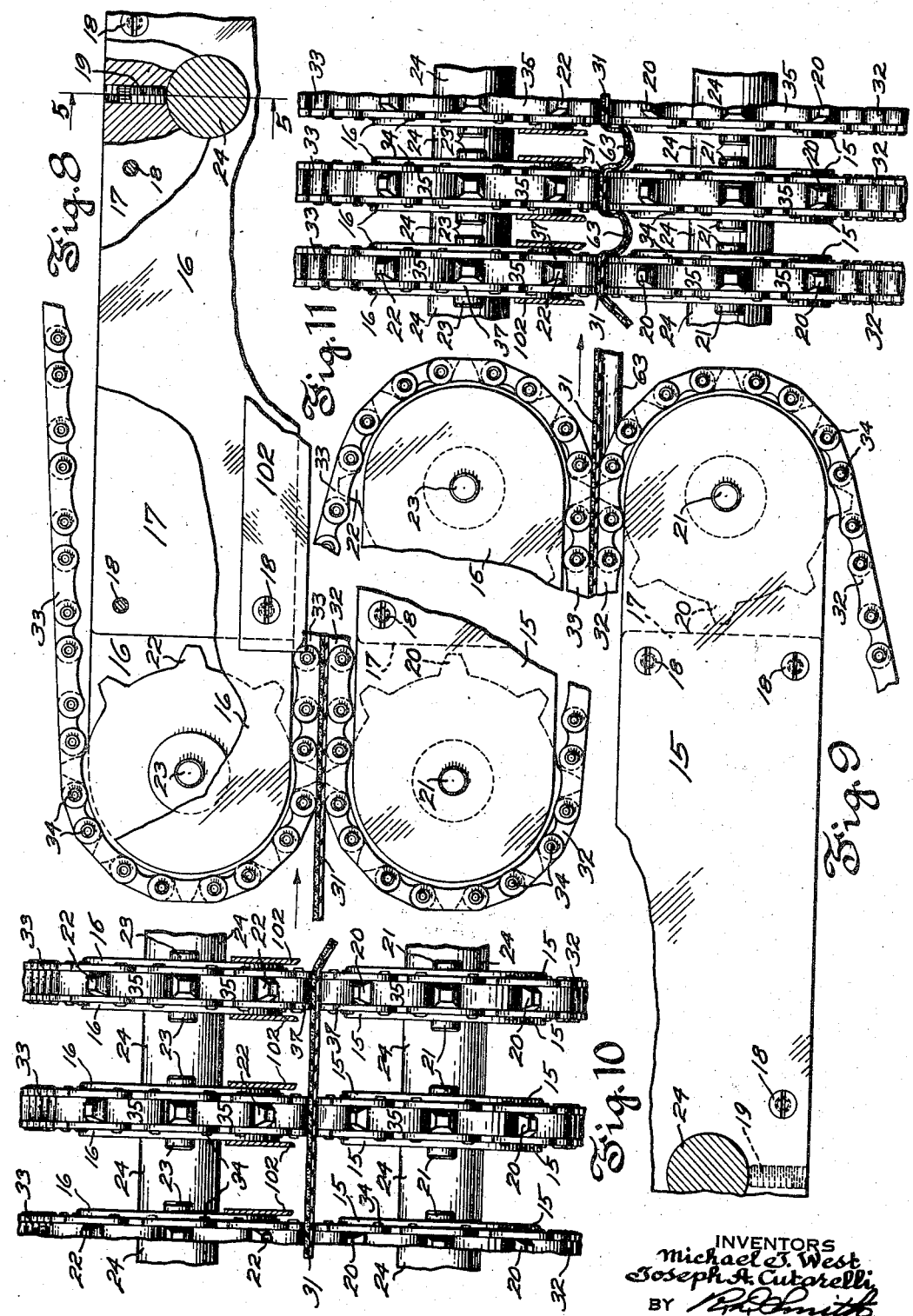

United States Patent Office 2,876,824
Patented Mar. 10, 1959

2,876,824

MACHINE FOR AND METHOD OF PROGRESSIVELY CORRUGATING PLASTIC SHEET MATERIAL

Michael J. West, Shelton, and Joseph A. Cutarelli, Ansonia, Conn., assignors to The B. F. Goodrich Company, New York, N. Y., a corporation of New York Application March 30, 1955, Serial No. 497,955

6 Claims. (Cl. 154—30)

This invention relates to ways and means for imparting corrugations to a sheet of limp, flabby, soft surfaced material of low toughness and slight tensile strength such as sponge rubber compound or uncured rubber sheet while it travels toward vulcanizing molds and for maintaining the imparted corrugations until the sagging furrows of the corrugations become deposited in cavities in the molds.

Need for imparting longitudinal corrugations to unlimited lengths of uncured sheet rubber is explained in United States Patent No. 2,319,042 granted to L. H. DeWyk, Jr., wherein a thin web of uncured rubber must be fed progressively into traveling vulcanizing molds whose cavities comprise adjacent continuous grooves extending in the direction of mold travel. Where the grooves that form such mold cavities are deep in proportion to their width, a web of uncured rubber laid flat across the upward opening mouths of the cavities must be stretched to an uneven and undesirable thinness when side by side bands of the web are forced down into full conformity with the contours of the cavity walls. By imparting to the web side by side corrugations that have predetermined lateral spacing according with the spacing of the adjacent cavities in the mold, the web can be fed to the traveling molds with the sagging furrows of its longitudinal corrugations occupying the respective mold cavities so that the web requires less stretching and will undergo practically no thinning out when first softened by heat and then forced downward into full surface contact with the contours of the cavity walls. In the patent referred to the uncured rubber web is forced fully into the cavities by the blowing expansion of a sponge rubber compound confined above the web by upper sections of the molds. The present improvements will successfully impart the needed corrugations to a two-ply web comprising both a ply of uncured rubber and a ply of sponge rubber compound. The surface of such material is tacky and tends to cling to surfaces making contact therewith.

One object of the invention is to form the corrugations referred to without occasioning any stretching or tearing of the traveling web.

Another object is to preserve and maintain the corrugations in the web during its subsequent transfer from the corrugating machine to traveling molds such as disclosed in the aforesaid patent.

Another object is to impart corrugations to a web of the kind of material concerned without necessitating relative movement of any kind between the traveling sheet stock and the means of support by which it is conveyed and converted into corrugated form.

A further object of the invention is to provide a machine and/or apparatus for imparting corrugations of the kind and for the purpose described of the simplest mechanical form and so constructed and operating that its parts will not become clogged with fragments of the web being corrugated nor require frequent cleaning or servicing over long periods of operation.

A still further object is to provide a corrugating machine in which the widths of the furrows of the corrugations may easily be varied by selective adjustment of elements of the machine, and in which the clinging or gripping effect of the conveyors upon the web may be varied to suit the consistency and thickness of the stock composing the web.

These and other objects of the invention will appear in greater detail in the following description of a satisfactory way of practicing the improved method and of constructing and operating a machine and apparatus in which the invention is embodied, such description having reference to the accompanying drawings wherein:

Fig. 1 is a side elevation of a web corrugating machine with associated apparatus embodying the present invention and useful in practicing the presently improved method of corrugating a traveling web.

Fig. 2 is a plan view of the machine and apparatus of Fig. 1.

Fig. 3 is a transverse cross sectional view taken on the plane 3—3 in Fig. 1 showing a two-ply web in the flat condition in which it enters the corrugating machine.

Fig. 4 is a view taken in section on the plane 4—4 in Fig. 2, showing the corrugated form of the web.

Fig. 5 is a view taken in section on the plane 5—5 in Fig. 8.

Fig. 6 is a perspective view of links of the web conveying chains of Figs. 1 and 2, drawn on an enlarged scale.

Fig. 7 is a fragmentary view on a considerably enlarged scale taken in the section on the plane 7—7 in Fig. 2 looking in the direction of the arrows.

Fig. 8 is a fragmentary view of the left end of the machine drawn on a larger scale than in Fig. 1 showing the web of Fig. 3 entering between the chains of conveyor links.

Fig. 9 is a fragmentary view on a corresponding scale showing the now corrugated web leaving the right end of the machine of Fig. 1.

Fig. 10 is an endwise view of the machine and uncorrugated web looking from the left at Fig. 8.

Fig. 11 is an opposite endwise view of the machine and the now corrugated web looking from the right at Fig. 9.

Fig. 12 is a fragmentary view on an enlarged scale taken in section on the plane 12—12 in Fig. 1 looking in the direction of the arrows.

Fig. 13 is a fragmentary view on an enlarged scale on plane 13—13 in Fig. 2.

The main parts of the corrugating machine include a frame 12 standing on legs 11 and serving to support a lower trackage deck 13 and an upper trackage deck 14. As each of these trackage decks are similar in construction it will suffice to say that the deck comprises a gang of separated pairs of side-by-side elongate bearing plates that are slightly spaced apart and extend from end-to-end of the machine. The bearing plates 15 of each of the pairs in the lower deck 13, like the bearing plates 16 of each of the pairs in the upper deck 14, are parallel, but the pairs of bearing plates in both decks are angularly related and converge as they extend from left to right in Fig. 1. Between the bearing plates of each pair there are one or more spacer bars 17 that fill the space therebetween and to which the bearing plates are secured by screws 18.

The lower trackage deck 13 comprising the bearing plates 15 and their spacer bars 17 is supported on cross rods 24 which extend through holes in the plates and bars. Bars 17 are secured to these cross rods in laterally adjustable spacing by means of set screws 19 threaded through the spacer bar. The ends 25 of cross rods 24 are flattened and held in vertically adjustable position on the threaded top end portions 26 of frame post 27 by means of nuts 28. The top edges of bars 17 serve as ways or tracks.

An idler sprocket wheel 20 is free to turn on a stub shaft 21 that is seated in each end of each pair of bearing plates 15 in the lower deck and such stub shaft spans the space between the plates. A like idler sprocket wheel 22 is free to turn on a similar stub shaft 23 that is seated in each end of each pair of the bearing plates 16 in the upper deck 14 and spans the space between the plates of each pair. Endless conveyor chains 32 and 33 are entrained about sprocket wheels 20 and 22, respectively. Thus chain 32 is vertically positioned by and operates in the lower deck 13 while chain 33 is vertically positioned by and operates in the upper deck 14. The links of chains 32 and 33 are constructed and pivotally connected together as shown in Fig. 6. Solid block-type links 35 having flat externally directed faces 36 are pivotally coupled by means of laterally spaced link bars 37 and hinge pins 34, the block links and the link bars being thus staggered crosswise the direction of travel of the chain. The former may be laminate.

Both conveyor chains 32 and 33 are power impelled independently at equal linear speed by vertically spaced gangs of side-by-side driving sprockets 40 and 41 which sprockets as shown in Fig. 13 are fast rspectively on a lower drive shaft 42 and on an upper power shaft 43. Shafts 42 and 43 extend respectively through vertically elongated clearance holes 56 in frame uprights 44 and are journaled respectively in vertically adjustable bearing boxes 38, 39 which are clamped respectively to frame uprights 44 by means of bolts 58 extending through vertically elongated slots 59 in the uprights. The construction in this respect is the same for the upper bearing boxes 39 as is shown for the lower bearing boxes 38 in Fig. 7. A transmission chain belt 45 is entrained about two shaft driving sprockets 46 and 46' which have an equal number of teeth and which are fixed on shafts 42 and 43, respectively. An additional idler sprocket 66 and an extra driven sprocket 70 are rotatably carried by shafts 67 and 68, respectively, that are rotatably supported in frame bearings 69 and 71, the former of which can be adjusted from left to right along the frame 12 in Fig. 7 to serve as adjustable tightener for the belt 45. Bolts 72 passing through elongated slots 73 in the base of frame bearings 69 enable the latter to be held in selected belt tightening positions. The upper power shaft 43 carries an additional sprocket 47 that is driven from any convenient source of power such as the motor 64 by a chain belt 48.

Chain tightening rollers 49 and 50 take up slack in the lower deck chains 32 and in the upper deck chains 33, respectively, and are free to turn in vertically adjustable positions determined by shifting upward or downward on frame uprights 44 the bearing brackets 53 and 54 in which the trunnions 51 and 52 of the rollers are respectively journaled. Each of these bearing brackets is held fast to the machine upright 44 by the clamping force of two of the bolts 58 hereinbefore mentioned.

While the web 31 to be corrugated, that is shown entering the machine in Figs. 1, 8 and 10 and leaving the machine in Figs. 1, 9 and 11, might be delivered from the corrugating machine directly into cavities in traveling molds as will be clear from the aforesaid Patent No. 2,319,042, there is shown in Figs. 1, 2 and 4 intermediate apparatus comprising a multiple ribbed or grooved table top 60 supported on legs 65 and provided with upstanding ridges 61 forming channels 62 therebetween. These channels are adapted to receive the downward sagging furrows 63 of the corrugations of web 31 as they pass endwise out of the machine.

It will be clear from Figs. 1, 10 and 11 that the sprocket wheels 20, 22 at the receiving end of the machine are spaced relatively farther apart than those at the discharge end of the machine and that their spacing can be varied at will by loosening the set screws 19 and shifting the bearing plates 15 and 16 lengthwise of cross rods 24 to accomplish the desired changes in spacing, after which the set screws will be retightened to maintain the spacing selected.

In carrying out the improved corrugating process with the aid of the machine and apparatus illustrated in the drawings, the web 31 of limp, flabby, soft surfaced material is fed into the left end of the machine in flat condition as shown in Figs. 1, 8 and 10. This web may be a sheet of single ply or multiple ply uncured rubber or sponge rubber compound or substances of comparably little toughness and textile strength. To accommodate various thicknesses and hardnesses of webs the space between the floor level stretch of chains 32 and the overlying stretch of the upper deck chains 33 is adjustable to appropriate dimension by varying the vertical spacing of cross rods 24 of the upper deck 14 from the cross rods of the lower deck 13 on their frame posts 27. The vertically elongated slots 56 and 59 in the frame uprights 44 give freedom for corresponding raising or lowering of the shafts 42, 51 and the shafts 43, 52, while transmission belt 45 can be kept properly taut by horizontal adjustment of frame bearing 69. In all vertical positions of the upper and lower decks 16, 15 the links in the lower reach of chains 32 glide along or track on the ways affording top supporting edges of the spacer bars 17 while the links in the upper reach of chains 33 bear upon and ride in unison with the top surface of the traveling web by virtue of their own weight.

Fig. 10 shows the relatively wide axial spacing of the sprocket wheels 22 from one another with the web 31 spanning the spaces between each pair of chains 32 and each pair of chains 33 in a horizontal plane without sagging because the web has enough tensile strength not to stretch under its own weight alone. As the upper stretches of lower chains 32 approach one another in traveling from left to right in Fig. 1 in unison with the equal rate of approach of the lower stretches of upper chains 33 the space between laterally adjacent chains progressively narrows causing the unsupported stretches of the limp web 31 to sag between the supporting chains 32. This produces furrows in the web as shown at 63 in Fig. 11 that extend alongside and between the spaced stretches of the web that are supported by chains 32. Thus there is now imparted to the web a corrugated form without having required relative movement of any kind between the supported surface of the web and the chain surfaces of the chain links which contact it.

Fig. 1 shows the corrugated web of Figs. 9 and 11 leaving the right end of the machine and sliding onward toward the right upon and along the channeled table top 60 whose web supporting and guiding surfaces are lubricated with stearate of zinc, powdered soap stone or other appropriate lubricant to reduce frictional resistance. The furrows 63 of the web occupy the channels 62 in the table and the furrows are thus maintained as the web continues away from the corrugating machine. Preferably the table top 60 slopes downward somewhat from left to right in Fig. 1.

From the right end of table 60 the corrugated web may play off or be transferred by conveyance into the cavity grooves of traveling molds of the type disclosed in U. S. Patent No. 2,319,042 in much the same manner that the web of uncured rubber is shown to be delivered to the traveling molds in said patent.

Variations in the composition, thickness, hardness and other physical properties of the web of work material operated upon sometimes call for the use of auxiliary equipment additional to the machine as so far described. It is sometimes desirable to provide a set of thin rotary baffle discs 75 reaching down into the channels 62 of the table top 60 to only a partial extent of their depth and preferably not far enough normally to contact the bottoms of the furrows 63 in the sheet of work material that occupy and slide along the channels. The thinness of discs 75 is such as normally to prevent contact also between the sides of these discs and the side walls of the work corrugations. If distortion of the corrugations in the work sheet occurs during their sliding travel along the table top 60 such distortions will encounter and be restrained as an exigency function by the presence of the baffle discs.

To insure that if and when the baffle discs 75 are contacted by the traveling corrugated web there shall result only assistance and never resistance to smooth uninterrupted travel of the work, each of the discs 75 is continually rotated at such speed of revolution that its rounded periphery moves at the same linear speed and in the same direction as does the work. This is accomplished by making the discs 75 fast to a cross shaft 76 that spans the width of table top 60 and has rotary bearing in side brackets 77 fastened adjustably by bolts 78 to the under surface of the table top.

Shaft 76 is driven by a sprocket wheel 79 fixed on it and driven by a chain belt 80 connecting sprocket wheel 79 with a sprocket wheel 81 fixed on shaft 68. In Fig. 1 arrows show the direction of rotary and linear operating movements of the parts heretofore described.

Another point in the machine where exigency constraint of the traveling web may be needed as a precaution against unwanted behavior of the soft flabby work material is near the left or work receiving end of the machine in Figs. 1 and 2. Here is where the furrows 63 begin to be formed by sagging of the transverse slack progressively imparted to the web as it travels from left to right. With some kinds of material this slack may result in a tendency of the web to arch upward instead of to sag downward between the converging conveyor chains. This is most likely to happen, if at all, near the beginning of the occurrence of the slack. Exigency constraint to prevent or reverse such tendency to bulge upward is provided in the machine of Figs. 1 and 2 by a sag promoting accessory comprising constantly traveling baffle chains 85 spaced across the width of the machine between each pair of conveyor chains 33 as shown in Fig. 2. As the system of sprocket wheel support for each of the baffle chains 85 is alike it will suffice to describe one such system.

There are four sprocket wheels in each of the systems referred to denoted 86, 87, 88 and 93 in Fig. 1. While each of sprocket wheels 86, 88 and 93 might have a separate and individual bearing stud they are here shown for simplicity as rotatable on shafts 89, 90 and 91, each of which spans the width of the machine and has rotary bearing in side plates 92 rising from the machine frame 12. Sprocket wheel 94 serves to adjust the tightness of chain 85 and is here shown for simplicity as rotatably mounted on a fourth shaft 94 that likewise spans the width of the machine but is mounted in two horizontally shiftable bearing boxes 95 held adjustably on the side frame plates 92 by bolts 96. All of the sprocket wheels 87 are fast on shaft 90 which carries fixed thereon an outboard sprocket wheel 97 driven by a transmission chain belt 98 that is entrained about an outboard sprocket wheel 99 on the main power shaft 43 of the machine.

A practical depth relationship of the lowermost reach of baffle chain 85 downward into the lateral gap between conveyor chains 32 is indicated in Figs. 1 and 12 where it is seen that the baffle chain need not act to force the sagging of the web of work material into furrows but needs only move continually at a linear speed equal to that of the travel of the work material and thus be in constant readiness to check or restrain any tendency of the web to arch upward in the early stages of its deflection into corrugated shape. When sagging is thus properly initiated it cannot automatically reverse itself into an arching deflection and hence, although the placement of the restraint chains 85 lengthwise of the machine is variable within the principles of this invention, it is usually sufficient that they perform their function at an incipient point in the course of travel of the web.

A further helpful accessory to insure satisfactory performance of the machine are the guide strips 102 secured by the screws 18 to the outer side faces of bearing plates 16 of the upper trackage deck. Strips 102 depend below the bottom edges of the bearing plates to an extent to overlap at least in part the links in the free and sagging portion of the traveling upper conveyor chain 33 thus to help maintain them in constant lateral alignment with the traveling lower conveyor chain 32. Guide strips similar to 102 may be secured in similar manner and for a corresponding purpose to the outer side faces of bearing plates 15 so as to project upward therefrom into overlapping relation to the lower conveyor chain 32.

While the location of baffle chains 85 has been illustrated as suitable for insuring sagging instead of arching of the intended furrows in the web of work material, their location and arrangement can be varied to cause them to project upward into the lateral gaps between the upper conveyor chains 33, instead of downward into the spaces between the lower conveyor chains 32, for corrugating processes requiring arching instead of sagging of the web of work material.

In the handling of some kinds of webs to be corrugated, flat-surfaced V-belts may be substituted for link chains conveyors 32, 33 and pulleys may be substituted for the sprocket wheels 20, 22. However, there is marked advantage over such alternatives in the web impelling action of flat link faces such as 36 clamping between them with light force only separated increments of the surface area of the web, which spot surface clamping action results from the relative alignment or register of the flat link faces 36 in the upper chain with the corresponding flat link faces 36 in the lower chain as shown in Figs. 8 and 9. Such alignment or register is maintained during simultaneous travel of the chains by the cooperative rotary setting upon their respective drive shafts of the sprocket wheels in the lower and superimposed gangs about which the chains are entrained. In this way the soft tacky surface of the web is not cut into nor damaged while the spacing of the link faces 36 in the direction of web travel by means of the link bars 37 produces an impelling grab on the web that is not present in a continuous belt if used as a conveyor.

Since the foregoing and many other variations are possible in the shapes and arrangements of the mechanical parts to accord with different dimensions and composition of webs capable of being corrugated thereby, the appended claims are directed to and intended to cover all equivalents or substitutes for the particular structures and arrangements herein disclosed as come fairly within a broad interpretation of the terminology of the claims.

We claim:

1. A machine for imparting to a flat traveling flexible web of work material corrugations extending longitudinally in the direction of travel of the web, including in combination, a support frame, a low level gang of side-by-side axially spaced apart wheels rotatably supported on said frame at a web receiving end of the machine, another low level gang of side-by-side axially spaced apart wheels rotatably supported on said frame at the web discharging end of said machine, separate endless side-by-side laterally spaced apart flexible web supporting conveyors extending lengthwise of the machine at said low level entrained respectively about two wheels of respectively different gangs, the wheels of the gang at said web discharging end of the machine being separated in axial direction by smaller distances than the wheels of the gang at said web receiving end of the machine, whereby during advance movement of said conveyors side-by-side reaches of said conveyors can jointly support and convey side-by-side stretches of the web of work material in converging paths of travel in a manner to cause unsupported stretches of said web to sag progressively in the gap between said conveyors thereby to form continuous corrugating furrows in the web, additional side-by-side laterally spaced apart web overlying flexible conveyors disposed directly over said web supporting conveyors at a height thereabove enabling said web overlying conveyors to bear on the upper surface of said stretches of web respectively, and means to guide and impel said web overlying conveyors in the same respective directions and at the same respective speeds as said web supporting conveyors.

2. A machine as defined in claim 1, together with a stationary work transfer table having parallel straight channels spaced apart laterally in accordance with the lateral spacing of the said conveyors at said web discharging end of the machine located beyond and in outboard relation thereto, said channels being aligned straight-away respectively with the spaces laterally separating said conveyors.

3. A machine for imparting to a flat traveling flexible web or work material corrugations extending longitudinally in the direction of travel of the web, including in combination, a support frame, a low level gang of side-by-side axially spaced apart sprocket wheels rotatably supported on said frame at a web receiving end of the machine, another low level gang of side-by-side axially spaced apart sprocket wheels rotatably supported on said frame at the web discharging end of said machine, separate side-by-side laterally spaced apart stretches of endless chain comprising pivotally connected web conveyor links extending lengthwise of the machine at said low level entrained respectively about two of said sprocket wheels of respectively different gangs, alternate links of said chain comprising block like bodies respectively having solid flat faces spaced apart endwise along the chain and presenting said flat faces into underlying impelling contact with only lengthwise spaced increments of the surface of said web, the sprocket wheels of the gang at said web discharging end of the machine being separated in axial direction by smaller distances than the sprocket wheels of the gang at said web receiving end of the machine whereby said alternate flat faced chain links support said spaced surface increments of the web in spaced converging rows and convey said web surface increments in converging paths of travel so that unsupported portions of said web between said rows are permitted to sag progressively in spaces between said stretches of chain during advance movement of the latter, thereby to generate continuous lengthwise extending corrugating furrows in the web, a superimposed gang of side-by-side axially spaced apart sprocket wheels rotatably supported on the said frame at the said web receiving end of the machine at a higher level than the said low level gang of wheels at said web receiving end of the machine, an additional superimposed gang of side-by-side axially spaced apart wheels rotatably supported on said frame at the said web discharging end of the machine at a higher level than said low level gang of wheels at said web discharging end of the machine, separate side-by-side laterally spaced apart superimposed stretches of endless chain comprising pivotally connected web clamping links like said web conveyor links extending lengthwise of the machine at said upper level entrained respectively about two of said sprocket wheels of the respectively different superimposed gangs in a manner to bring into mutual register the said solid flat faces of the said block-like link bodies of the chains in both said low level and superimposed stretches of chain, the wheels of said superimposed gang at said web discharging end of the machine being separated in axial direction by smaller distances than the wheels of the superimposed gang at said web receiving end of the machine, whereby said flat link faces in said end of the machine, whereby said flat link faces in said superimposed reaches of chain can bear upon the said web of work material in superimposed alignment with said flat faces of links in said low level reaches of chain respectively thereby jointly to clamp the web between said flat link faces in separated areas of the surface of the web during simultaneous advance movement of all of the said chain stretches in laterally converging paths of travel.

4. A machine as defined in claim 3, in which there are connecting bars flanking and pivotally coupled to the said block-like links so as to form with the said flat link faces coplanar web contacting components of the said conveyor laterally staggered in relation to the direction of travel of the conveyor.

5. The method of imparting lengthwise corrugations to a traveling web of limp flabby sheet material having a soft tacky surface, which includes the steps of, gripping directly opposite top and bottom surfaces of only laterally spaced apart longitudinally extending stretches of the thickness of said web with sufficient support and holding force to inhibit random sidewise straying of said gripped stretches of the web while leaving intermediate stretches of the web free to sag, and simultaneously conveying said gripped stretches of the web lengthwise at equal speed in converging paths of travel thereby to cause said intermediate stretches of the web to sag crosswise between said gripped stretches into progressively deepening furrows whereby corrugations are formed in the traveling web.

6. The method of imparting lengthwise corrugations to a traveling web of limp flabby sheet material having a soft tacky surface, which includes the steps of, gripping directly opposite top and bottom surfaces of only laterally spaced apart longitudinally extending stretches of said web with sufficient support and holding force to inhibit sidewise straying of said gripped stretches of the web while leaving intermediate stretches of the web free to sag, simultaneously conveying said gripped stretches of the web lengthwise at equal speed in converging paths of travel thereby to cause said intermediate stretches of the web to sag crosswise between said gripped stretches into progressively deepening furrows whereby corrugations are formed in the traveling web, freeing the corrugated web from its said support and holding force, and advancing the corrugations of said freed traveling web progressively to and lengthwise along side-by-side stationary table channels respectively while supported thereby in sliding contact therewith, whereby said furrows receive shape preserving support from said channels while advancing lengthwise thereof.

References Cited in the file of this patent

UNITED STATES PATENTS

| | | |
|---|---|---|
| 793,316 | McMillin | June 27, 1905 |
| 2,085,417 | Cramer | June 29, 1937 |
| 2,125,001 | Cowen et al. | July 26, 1938 |
| 2,158,087 | Rowe et al. | May 16, 1939 |
| 2,319,042 | DeWyk | May 11, 1943 |
| 2,335,313 | Rowe et al. | Nov. 30, 1943 |